US010331793B2

(12) United States Patent
Dotterer et al.

(10) Patent No.: US 10,331,793 B2
(45) Date of Patent: Jun. 25, 2019

(54) METHOD AND APPARATUS TO FACILITATE HIGH-QUALITY TRANSLATION OF TEXTS BY MULTIPLE TRANSLATORS

(71) Applicant: ProZ.com, Syracuse, NY (US)

(72) Inventors: Henry J. Dotterer, Manlius, NY (US); Rumi Dotterer, Manlius, NY (US)

(*) Notice: Subject to any disclaimer, the term of this patent is extended or adjusted under 35 U.S.C. 154(b) by 230 days.

(21) Appl. No.: 14/056,682

(22) Filed: Oct. 17, 2013

(65) Prior Publication Data

US 2014/0142918 A1    May 22, 2014

Related U.S. Application Data

(60) Provisional application No. 61/715,246, filed on Oct. 17, 2012.

(51) Int. Cl.
| | | |
|---|---|---|
| *G06F 17/28* | (2006.01) | |
| *G06Q 10/06* | (2012.01) | |
| *G06Q 10/10* | (2012.01) | |

(52) U.S. Cl.
CPC ........ *G06F 17/289* (2013.01); *G06F 17/2836* (2013.01); *G06F 17/2854* (2013.01); *G06Q 10/06* (2013.01); *G06Q 10/10* (2013.01)

(58) Field of Classification Search
CPC .................................................. G06F 17/2836
See application file for complete search history.

(56) References Cited

U.S. PATENT DOCUMENTS

| 8,145,472 B2* | 3/2012 | Shore ................. G06F 17/2836 704/2 |
| 8,983,825 B2* | 3/2015 | Sarr ...................... G06F 17/289 704/10 |
| 9,025,760 B1* | 5/2015 | Pettay ................... H04M 3/562 379/202.01 |
| 2005/0086044 A1 | 4/2005 | Hess et al. |

(Continued)

FOREIGN PATENT DOCUMENTS

| JP | 2004038406 | 2/2004 |
| JP | 2009181539 | 8/2009 |
| KR | 20040106156 | 12/2004 |

OTHER PUBLICATIONS

International Search Report and Written Opinion, International Application No. PCT/US2013/065486, dated Jan. 29, 2014.

*Primary Examiner* — Matthew H Baker
(74) *Attorney, Agent, or Firm* — Heslin Rothenberg Farley & Mesiti P.C.

(57) ABSTRACT

A method for facilitating the high quality translation of matter by multiple translators, which includes a processor obtaining translated segments from a first group, where each translated segment is a translation of a source text segment, where each source text segment is a portion of a source text, and where for each of the source text segments, at least one translated segment is obtained, and selecting a second group and notifying the second group of an opportunity, where the opportunity comprises the group accessing the translated segments obtained from the first group and the second group providing data regarding the quality of the translated seg- (Continued)

ments. The method also includes obtaining data regarding the quality of the segments from the second group and determining a designated translated segment for each source text segment and generating a final translation.

16 Claims, 10 Drawing Sheets

(56) References Cited

U.S. PATENT DOCUMENTS

| | | | |
|---|---|---|---|
| 2006/0020928 A1 | 1/2006 | Holloway et al. | |
| 2007/0294076 A1* | 12/2007 | Shore .................. | G06F 17/2836 704/2 |
| 2009/0119091 A1* | 5/2009 | Sarig ................... | G06F 17/2836 704/2 |
| 2009/0198487 A1* | 8/2009 | Wong ...................... | G06F 17/28 704/4 |
| 2009/0248482 A1* | 10/2009 | Knyphausen ....... | G06F 17/2836 705/37 |
| 2010/0120404 A1* | 5/2010 | Bernal ................... | H04M 3/51 455/417 |
| 2010/0223048 A1* | 9/2010 | Lauder ................ | G06F 17/2836 704/4 |
| 2013/0124185 A1* | 5/2013 | Sarr ...................... | G06F 17/289 704/2 |
| 2013/0144594 A1* | 6/2013 | Bangalore ........... | G06F 17/2836 704/2 |

* cited by examiner

METHOD AND APPARATUS TO FACILITATE HIGH-QUALITY TRANSLATION OF TEXTS BY MULTIPLE TRANSLATORS

CROSS-REFERENCE TO RELATED APPLICATION

This application claims the benefit of U.S. Provisional Application No. 61/715,246, filed Oct. 17, 2012, which is incorporated herein, by reference, in its entirety. The present application is related to PCT Patent Application No. PCT/US14/046369 entitled "Method and Apparatus to Facilitate High-Quality Translation of Texts by Multiple Translators" filed on the date of filing of the present application, which is incorporated herein by reference in its entirety.

FIELD OF INVENTION

The present invention relates to an apparatus and method of facilitating the high quality translation of matter by multiple translators.

BACKGROUND OF INVENTION

Human language is exceedingly rich and complex. The job of translating human language can be highly challenging as a result. When translating a sentence from one language to another (or, in industry parlance, from a "source" to a "target" language), it is rarely enough to substitute, one by one, words in the target language for words in the source language. In most cases, the job of the translator is to write, anew, a sentence in the target language that are, as near as possible, equivalents for each sentence in the source language.

This goal of achieving equivalence is the central challenge in translation. How difficult it is to do that depends in part on the nature of the material being translated. While there are texts that are relatively easy to translate (a sentence such as "press the start button", for example, could be translated into most languages fairly readily), most texts are not. A sentence like "ain't life grand?" for example, which might appear simple at first, actually has several levels of meaning and nuance embedded in it. The sentence not only tells us that "life is wonderful", it also says something about the speaker. It may be difficult to find an expression in another language that has the same literal meaning, is colloquial, is snappy, and similarly calls to mind a speaker who is likely to be a man from a certain era.

These multiple layers of meaning, make finding true translation equivalents difficult. And because of this difficulty, which applies when translating all but the most straightforward of texts, much of the material that could theoretically be translated, is not. The overwhelming majority of the world's printed information, and especially literature, poetry, comedy, musical lyrics, and similar rich forms of text, have not been translated.

Systems have been developed to facilitate the process of carrying out human translation. Such systems fall into two types.

The most common type of conventional system, which constitutes the overwhelming majority of conventional systems, takes a "one-text, one-translator" approach (term coined for the purposes of this filing); that is, these systems rely on a single translator to translate each portion of a source text. Designed for efficiency and low cost, this type of system is problematic from a quality standpoint because of human error and the limits in creativity and judgment inherent to any one person. Generally speaking, a single translator cannot, over time, match the ability of a group of translators to creatively produce target-language equivalents of complex texts.

The second type of conventional system—the "redundant translation" type (term coined for the purposes of this filing)—is designed to have the same text translated by multiple translators. A limitation of these systems is that they do not put the translators in communication with each other. Because of the way these systems control quality, i.e., matched translations, produced independently, are regarded as "correct," translators are required to work independently. Because there is no collaborative benefit to such systems, they suffer from a similar quality limitation as "one-text, one-translator" systems. In fact, these systems have not been designed to achieve higher quality than "one-text, one-translator" systems; they are intended primarily to reduce cost. Moreover, the incentives that such systems typically employ (for example, some systems find translators by inviting laypersons to take part as an exercise in language learning) are not necessarily applicable to professional and/or experienced translators, and are not necessarily consistent with producing high-quality translations of texts.

A need exists for a system that taps the collective creativity, intelligence and/or judgment of a group of human and/or automated translators, and optionally other human and/or automated participants, to maximize the quality of translation of challenging texts.

SUMMARY OF INVENTION

Shortcomings of the prior art are overcome and additional advantages are provided through the provision of a method for facilitating the high quality translation of matter by multiple translators. The method includes: obtaining, by a processor, translated segments from a first group, where each translated segment is a translation of a source text segment, where each source text segment is a portion of a source text, and where for each of the source text segments, at least one translated segment is obtained; selecting a second group and notifying the second group of an opportunity, wherein the opportunity comprises the second group accessing the translated segments obtained from the first group and the second group providing data regarding the quality of the translated segments; obtaining, by the processor, the data regarding the quality of the segments from the second group and determining a designated translated segment for each source text segment; and generating, by the processor, a final translation wherein the final translation comprises the designated segment for each source text segment and wherein the final translation comprises a translation of the source text.

Computer systems, computer program products and methods relating to one or more aspects of the technique are also described and may be claimed herein. Further, services relating to one or more aspects of the technique are also described and may be claimed herein.

Additional features are realized through the techniques of the present invention. Other embodiments and aspects of the invention are described in detail herein and are considered a part of the claimed invention. For example, embodiments of the present invention utilize a complete source text and receive full translations of the source text, rather than the aforementioned segmented texts and translations. Further embodiments may include the processor selecting a third group and notifying the third group of a text analysis opportunity, where the text analysis opportunity comprises the third group accessing the source text and providing data regarding the source text.

BRIEF DESCRIPTION OF DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawings.

FIGS. 6A-6E depict aspects of an embodiment of the present invention.

DETAILED DESCRIPTION OF THE INVENTION

The computer system, method, and computer program product described herein address the problem of the difficulty of translating challenging texts, by bringing to bear the collective creativity, intelligence and judgment of a group of translators, including but not limited to, human and automated translation services, and optionally other human or automated participants, to produce high-quality translations of such texts.

Figure 1:
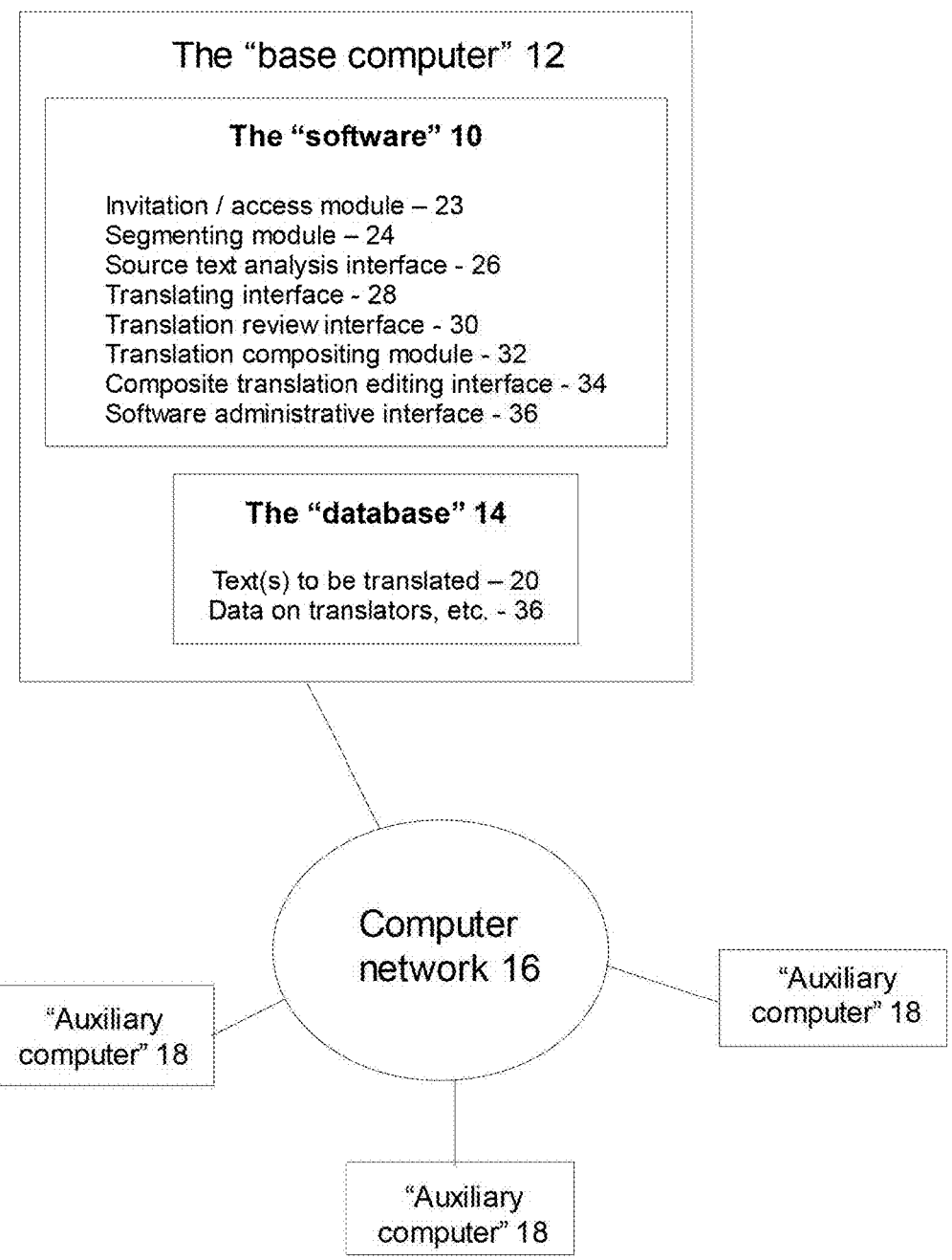
FIG. 1 depicts a computer system configured to perform an aspect of an embodiment of the present invention.

FIG. 1 is a computer system 100 configured to perform at least one aspect of an embodiment of the present invention. In the embodiment of FIG. 1, software 10 is executed by at least one processor on a computer, termed a base computer 12 in FIG. 1 for clarity. The terms software, program code, computer program code, code, computer program product, and executable instructions, are used interchangeably throughout this application.

The software comprises code that is accessible to the processor and executable by at least one processor of the computer 12. The software can be stored on a memory on the physical computer 12, and/or in a memory and/or on removable media accessible to the computer 12 via a network connection, including but not limited to, a wireless and/or wireless network, utilizing a protocol known to one of skill in the art. The computer may also be configured to act as a web server, which may be capable of running the software and hosting and/or interacting with the database 14.

The base computer 12, as well as any other computer described in the present specification can includes personal computers, servers, smart phones, mobile devices, laptops, desktops, and/or any means of personal or corporate computing device capable of executing the software 10 or portions of the software 10, or communicating with a computer executing the software 10 over a wireless or hard wired network.

The embodiment of FIG. 1 utilizes different modules within the software 10 to perform different functionality.

This separation of functionality into modules is offered for ease of understanding as a non-limiting example of a possible organization of the software 10. Some of modules included in the software 10 of this embodiment include, but are not limited to, an invitation/access module 23, a segmenting module 24, source text analysis interface 26, a translating interface 28, a translation review interface 30, a translation compositing module 32, a composite translation editing interface 34, and a software administrative interface 36.

In the embodiment of FIG. 1, the base computer is connected to a computer network 16, including but not limited to private and publicly accessible wired and wireless networks, and the Internet. In this embodiment, one or more computers, termed auxiliary computers 18a-18c are communicatively connected to the computer 12 via a computer network 16, including but not limited to, the Internet. The auxiliary computer 18a-18c receive data from the computer 12, via, for example, the web server on the computer 12 and the auxiliary computers 18a-18c can render (for viewing) source texts for translating served by the base computer 12, and the base computer can obtain data from the auxiliary computers 18a-18c, including but not limited to, translations of the source texts.

The base computer 12 in the embodiment of FIG. 1 includes a database 14. Additional embodiments of the present invention utilize databases and other memory devices in different physical locations that are remotely accessible to the base computer 12 executing the software 10. In the embodiment of FIG. 1, the database 14 stores the source text 20 to be translated, as well as data related to various translators and/or other participants, to be utilized the translate the source text 20, provide commentary on the source text, and/or provide data, including but not limited to, feedback, regarding translations of the source text.

In embodiments of the present invention, translators can include both human and automated translators. Data can also be stored in the database 14 that relates to additional participants in the methods of the present invention. As aforementioned, these additional participants may or may not be translators. Data may include, but is not limited to, contact information, fluency information, data concerning past participation in the methods of the present invention, such as data related to the types and quality of translations and reviews previously provided, and biographical information for individuals and automated translation programs and systems capable of analyzing written texts, such as the source text 20.

Figure 2:
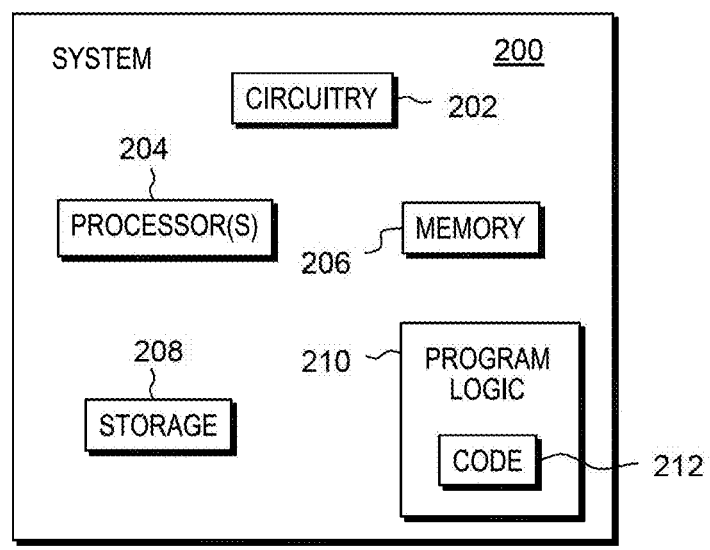
FIG. 2 depicts one embodiment of a single processor computing environment to incorporate and use one or more aspects of the present invention.

FIG. 2 illustrates a block diagram of a resource 200 in computer system 100, such as base computer 12 and auxiliary computers 18a-18c, which is part of the technical architecture of certain embodiments of the technique. Returning to FIG. 2, the resource 200 may include a circuitry 202 that may in certain embodiments include a microprocessor 204. The computer system 200 may also include a memory 206 (e.g., a volatile memory device), and storage 208. The storage 208 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 208 may comprise an internal storage device, an attached storage device and/or a network accessible storage device. The system 200 may include a program logic 210 including code 212 that may be loaded into the memory 206 and executed by the microprocessor 204 or circuitry 202.

In certain embodiments, the program logic 210 including code 212 may be stored in the storage 208, or memory 206.

In certain other embodiments, the program logic 210 may be implemented in the circuitry 202. Therefore, while FIG. 2 shows the program logic 210 separately from the other elements, the program logic 210 may be implemented in the memory 206 and/or the circuitry 202.

Figure 3:
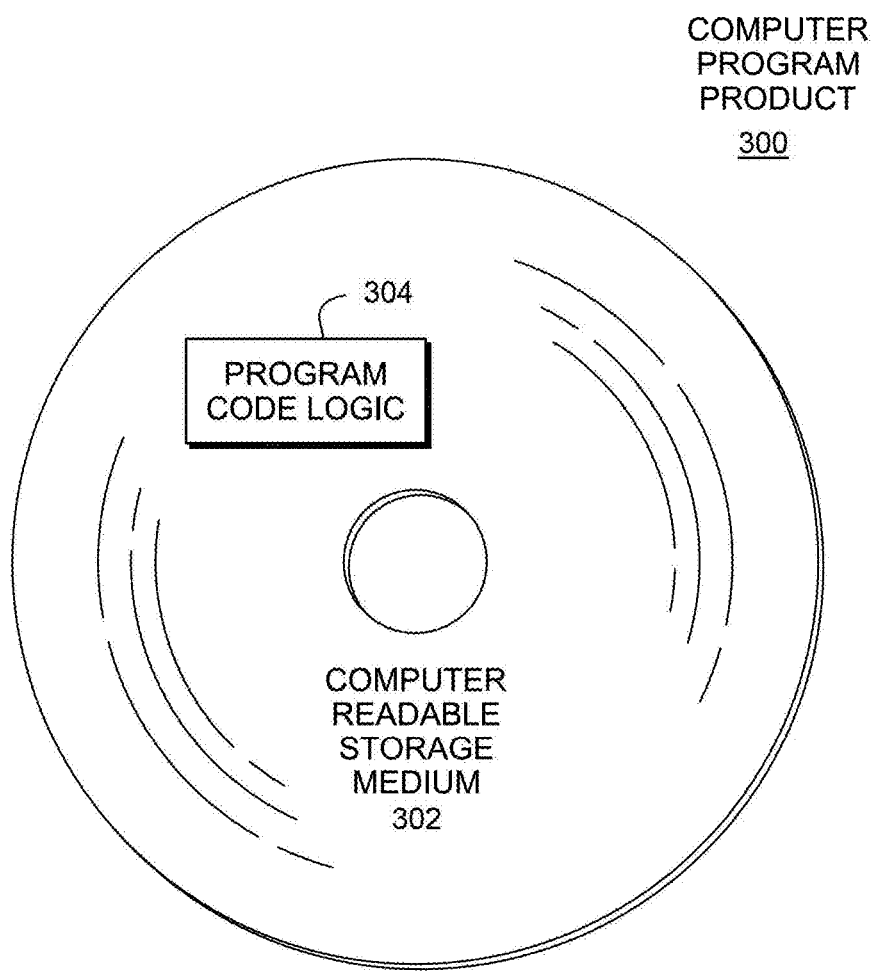
FIG. 3 depicts one embodiment of a computer program product incorporating one or more aspects of the present invention.

Using the processing resources of a resource 200 to execute software, computer-readable code or instructions, does not limit where this code can be stored. Referring to FIG. 3, in one example, a computer program product 300 includes, for instance, one or more non-transitory computer readable storage media 302 to store computer readable program code means or logic 304 thereon to provide and facilitate one or more aspects of the technique.

As will be appreciated by one skilled in the art, aspects of the technique may be embodied as a system, method or computer program product. Accordingly, aspects of the technique may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the technique may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the technique may be written in any combination of one or more programming languages, including an object oriented programming language, such as Java, Smalltalk, C++ or the like, and conventional procedural programming languages, such as the "C" programming language, PHP, ASP, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the technique are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions, also referred to as software, such as the software 10 in FIG. 1, may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the technique. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the technique may be provided, offered, deployed, managed, serviced, etc. by a service provider who offers management of customer environments. For instance, the service provider can create, maintain, support, etc. computer code and/or a computer infrastructure that performs one or more aspects of the technique for one or more customers. In return, the service provider may receive payment from the customer under a subscription and/or fee agreement, as examples. Additionally or alternatively, the service provider may receive payment from the sale of advertising content to one or more third parties.

In one aspect of the technique, an application may be deployed for performing one or more aspects of the technique. As one example, the deploying of an application comprises providing computer infrastructure operable to perform one or more aspects of the technique.

As a further aspect of the technique, a computing infrastructure may be deployed comprising integrating computer readable code into a computing system, in which the code in combination with the computing system is capable of performing one or more aspects of the technique.

As yet a further aspect of the technique, a process for integrating computing infrastructure comprising integrating computer readable code into a computer system may be provided. The computer system comprises a computer readable medium, in which the computer medium comprises one or more aspects of the technique. The code in combination with the computer system is capable of performing one or more aspects of the technique.

Further, other types of computing environments can benefit from one or more aspects of the technique. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the technique, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Figure 4:
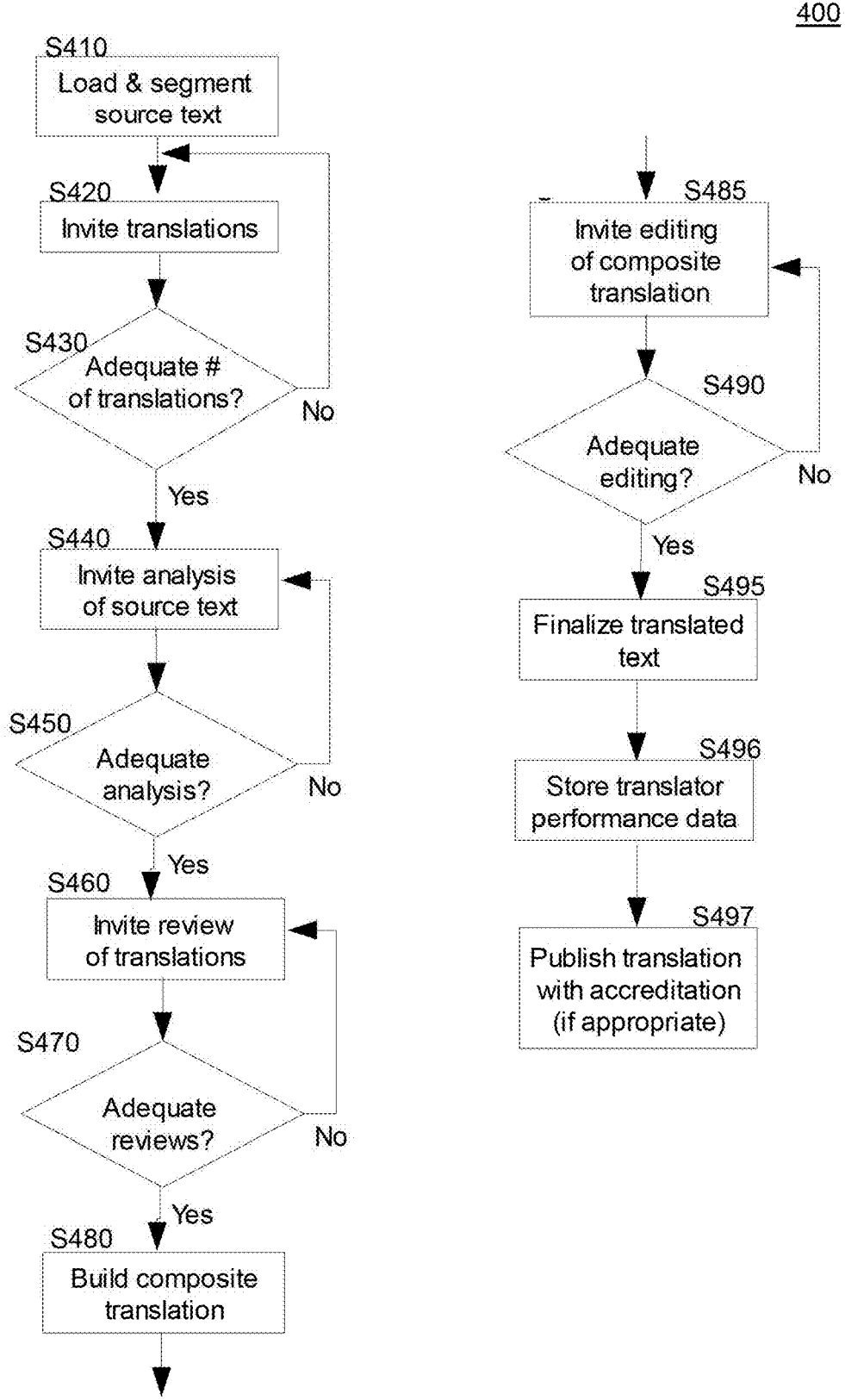
FIG. 4 depicts a workflow of an aspect of an embodiment of the present invention.

FIG. 4 is an exemplary workflow of the present invention that can be performed by a computer system, such as that in FIG. 1, utilizing resources, such as that in FIG. 2. For ease of understanding, the process of FIG. 4 is framed in the context of the system of FIG. 1.

In the embodiment of FIG. 4, the source text to be translated is loaded and segmented. In an embodiment of the present invention, the software 10 segments the source text into pieces (segments) for translations to enable translators and other participants to more easily provide translations and/or data and intelligence regarding both the source text and the translations. For example, in an embodiment of the present invention, rather than translate an entire text, or provide data regarding an entire text and/or translations of an entire text, the segmentation enables the system to gather incremental information about the translations and/or text, which, as explained below, contributes to the ability of the software to generate a translation of a higher quality. Segmenting the text also enables the collection of data concerning the quality of each translated segment to determine the best whole translation.

In embodiments of the present invention, the segmentation of the text includes, but is not limited to, storing portions of the text separately and/or retaining the whole of the source text but placing markers within the text to represent segments, although the text itself remains a single unit. For ease of understanding, the text is described in terms of segments, however, embodiments of the present invention may segment the text physically and/or logically (keeping the text as a whole with marker delineating the different segments). Additionally, as described later in this application, when segments are translated individually, the translations can be stored per segment or as a single translation with only logical markers delineating the different segments.

Figure 5:
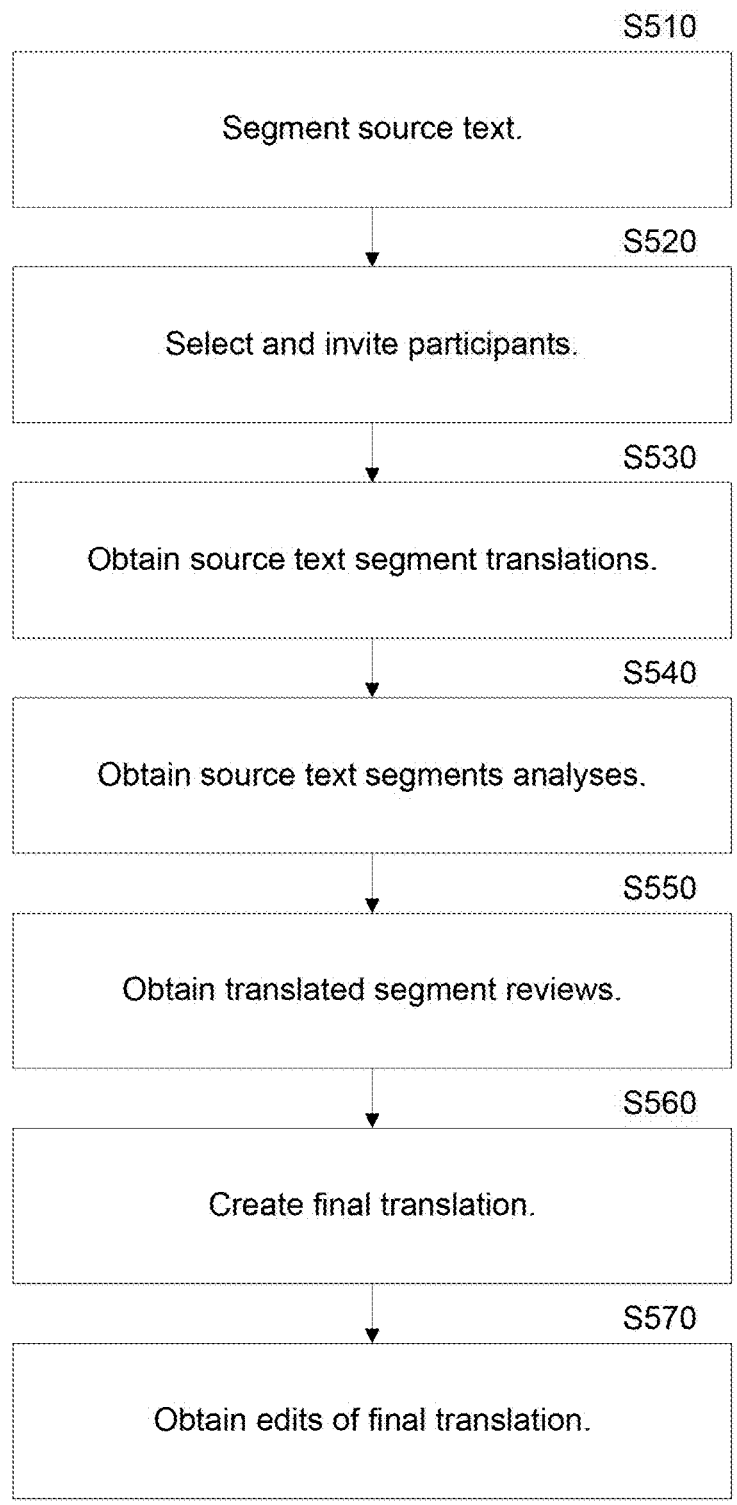
FIG. 5 depicts a workflow of an aspect of an embodiment of the present invention.

In further embodiments of the present invention, the software 10 does not segments the text and does not obtain translations of individual segments. Rather, the source text is obtained and stored in its entirety and the translations are obtained and reviewed in their entirety. The processes discussed in the embodiments of FIGS. 4 and 5 are applicable to embodiments that utilize a non-segmented source text and obtains non-segmented translations. In these embodiments, the source text is reviewed, translated, the translations are reviewed, and a final translation, such as a best translation, is ultimately selected.

In further embodiments of the present invention, the source text can be segmented, while the translations are not. In further embodiments of the invention, the source text is not segmented while the translations are segmented. Whether these items are segmented can be mutually exclusive. The system can be configured for all the options discussed in accordance with user preferences and/or parameters related to the translation data 22.

To start the translation process 400 in FIG. 4, the software 10 executed by a processor on the base computer 12 loads the translation data 22 onto the base computer 12 and stores the data in the database 14 on this base computer 12 (S410). In this embodiment, the software 10 is installed on the base computer 12. The translation data 22 includes the source text 20 for translation.

While the translation data 22 is loaded and/or after it is loaded, the software 10 divides the source text 20 into translatable segments (S410). To accomplish this task, the software 10 can employ both proprietary and known processes. For example, in an embodiment of the present invention, the software 10 calls a segmentation program that resides on the base computer 12 and/or is accessible to the base computer 12. In an embodiment of the present invention the software 10 segments the source text 20 by executing its segmenting module 24. As aforementioned, the software 10 can physically segment the text and/or logically segment the text by inserting markers and/or tags to logically delineate different segments in the text.

As discussed earlier, in further embodiments of the present invention, the software 10 does not segment the source text 20 and the source text 20 remains a single entity without delimiters, either actual or logical. In these embodiments, the source text 20 is translated by each translator and a single selected translation, such as a "best" translation, is the result of the technique. In another embodiment of the present invention, a configurable option enables an administrator to select whether the source text 20 should be segmented or not.

Returning to FIG. 4, by referencing the translation data 22 in the database 14, in this embodiment, the software 10 selects at least one translator to translate one or more segments of the source text 20. The invitation/access module 23 of the software 10 selects a group of translators or other individuals to notify that a source text 20 is available to be translated. The invitation/access module 23 may also select more than one translation program to participate in translating the source text 20. In embodiments of the present invention, the invitation/access module 23 can select prospective translators for a given translation opportunity based upon parameters associated with the source text 20 that is optionally part of the translation data 22. For example, a parameter could indicate that the text is in Spanish and should be translated into English. In this event, the invitation/access module 23 searches the translation data 22 in the database for individuals and/or programs capable of translating a Spanish text into English. The specificity of the data on translators 36 can be very specific. For example, in the above task of translating Spanish to English, the Spanish text may be in a Spanish dialect common in the Dominican Republic but not considered common in Spain. Thus, the software 10, in an embodiment of this technique, could invite translators from the Dominican Republic and not those from other Spanish-speaking regions.

Translators could also optionally be selected based on their rates and the rate demands associated with the source text. Hence, in embodiments of the present invention, the translation data 22 can contain parameters that affect who the software 10 selects as prospective translators.

Returning to FIG. 4, in this embodiment, translators, human and/or automated, are invited to translate the segmented original text (S420). In the event that the invitation/access module 23 of the software selects human translators from the database 14, these translators are notified and/or invited by the invitation/access module 23 to translate at least a portion of the source text 20 (S420). The software 10 may notify selected translators by various electronic methods, including but not limited to, email, SMS, MMS, or other form of notification over the computer network 16. The software 10 notifies selected translators that the source text 20 is available for translation (S420).

In embodiments of the present invention, the software 10 can utilize known methods of notification including, but not limited to, email, SMS, and MMS. The notification received by the selected individuals may include a link directly to access the software 10 and/or credentials generated by the software 10 for each individual upon selection of the individual. A translator may also be required to access the software 10 by the path provided in the notification, but the software 10 could require the individual to enter additional information, including updating and/or confirming a profile, and/or setting up a password, before enabling the user to submit a translation.

When the software 10 selects an automated translator, the software 10 connects to the software 10, for example, by performing a handshake or a call, and sends one or more segments of the source text 20 for translation and then obtains the translated product over the computer network 16.

In this embodiment, human translators who receive one or more segments of the source text 20, or access to these segments, may submit translations, via the translating interface 28, on a segment by-segment basis, of the source text 20. Once obtained, these translations are stored in the database 14. In embodiments of the present invention, the translations are stored in the database with information about the translators who have submitted them. In an embodiment of the present invention, the translations can be obtained, for example, via a graphical user interface (GUI) that is rendered on an auxiliary computer 18a-18c. By enabling translation of the text on a segment-by-segment basis, as opposed to as a whole, the software 10 obtains a more granular translation and is later able to evaluate the quality of the translation using measures tied to the granularity of the translations obtained.

Embodiments of the present invention obtain translations on a segment-by-segment basis as well as entire translations of the source text 20. Just as a segmented source text can be stored as a single unit with logical tags delineating the segments and/or actual physical segments, the software 10 can store the translations of the segments as separate, physical segments, or as a single text with tags separating the translations that coordinate with each source text 20 segment.

Referring to FIG. 4, the software 10 determines whether there is an adequate number of translations (S430). While receiving translations from the selected translators, the software 10 tracks the number of translations received for the segments until a threshold number of translations is received (S430). In embodiments of the technique, this threshold includes one or more translations per segment.

In an embodiment of the invention, the software monitors the incoming translations from both human and automated participants. After the software 10 receives a threshold number of translations from multiple translators, the software 10 again notifies a pool of participants, including, but not limited to, translators, utilizing the computer network 16. In embodiments of the present invention, this threshold is configurable. In an embodiment of the present invention, the threshold can be calculated and established by the software 10 based on past translation projects and the mean or median number of translations per segment needed to achieve a final product, a composite translation, which is discussed later, with a moderate and/or high level of confidence. Embodiments of the present invention utilize a time window instead of a threshold, i.e., all translations are accepted until a pre-defined period of time has lapsed.

Referring to FIG. 4, in this embodiment of the invention, in a "source text analysis" phase, those who participated in the translation process, optionally, and optionally other translators or additional participants, are given a means of collaboratively analyzing the source text, either overall or on a segment-by-segment basis (S440). At some point after translations have been obtained from multiple translators, notification may be sent, either automatically or at the request of an operator using the software's administrative interface 36, to suitable translators and/or text analyzers to invite them to participate in a group exercise of analyzing the source text. Interested parties may then, using the source text analysis interface 26, submit comments or other descriptive information, such as tags, etc., (and/or agree/disagree with comments, tags, etc. submitted by others), concerning the source text. The software 10 then evaluates whether the analysis is quantitatively and/or qualitatively sufficient.

Referring to FIG. 4, the software 10 selects a group of translators and/or other participants and invites them to participate in a group exercise of analyzing the source text. During this review, the participants who are connected to the system are able to submit analyses of the source text segments and/or are able to view and rate the analyses submitted by other users. Thus, as designated in FIG. 4, when the software 10 determines that the analysis is adequate, the next process can begin (S450).

Unlike the group selected to translate text, the members of the group selected to analyze the source text need not include individuals capable of performing any translations. In an embodiment of the present technique, the members of the group invited to provide analysis, and from whose input the software 10 obtains data regarding the source text, are identified from the database 14 by the software 10 as individuals (or non-humans) with fluency in the source text, who can provide insight into the meaning of each segment, for example, these individuals may identify and explain idioms, offer connotations, and/or provide context. In embodiments of the present invention, these analyses can be made available to translators and/or reviewers, thereby contributing to higher quality translations and/or reviews. In embodiments of the present invention, this information contributes to the intelligence utilized by the software 10 in evaluating the quality of the translations and/or selecting a best translation for the source text.

In an embodiment of the present invention, the analysis (ses) submitted by a group member constitutes data about the source text and/or one or more segments of the source text that assists in understanding the source text and in evaluating the translations. For example, if the segment for translation is the Yogi Berra quote, "When you come to a fork in the road, take it," analysis offered could include information regarding the origins of the quote. This information could assist translators and/or evaluators of the translations, in understanding whether the word "fork" in the sentence refers to a configuration of paths or to the common piece of tableware. Although the same word is used for both in English, if the task is to translate the text into another language, two different words could represent the different concepts and a translation utilizing the correct one will rate above a translation that misunderstands the context.

Returning to FIG. 4, after receiving analyses regarding the text, the software 10 invites a review of the translations of the text (S460). In various embodiments of the present invention, the software 10 selects and notifies a group of contacts, which may include at least one member of the group of the translators, to review the obtained translations (S460). As seen in FIG. 5, in some embodiments of the present invention, the review of the source text occurs before the translation of the text and therefore, the review of the translations occurs after the submission of translations.

Returning to FIG. 4, in embodiments of the present invention, the software 10 may be configured to send the invitations to review the translated source text automatically when a preconfigured and/or calculated threshold is reached, or an operator of the base computer 12 may make a selection in a GUI or administrative interface 36 to send these notifications to suitable translators, text analyzers and/or other participants. The software utilizes criteria to identify the group of individuals and/or automated programs to rate the quality of the received translations. In and embodiment of the present invention, the criteria can be defined in the translation data 22 and/or derived based upon data related to the source text 20 and/or translations already received. For example, one pool of translators can be selected to translate the text while another group, which may or may not contain exclusively translators, is selected to rate the translations. The same group can also both translate and rate translation that the software 10 receives. In embodiments where the same group translates and reviews, translators may be invited to submit translations and reviews concurrently.

In another embodiment of the present invention, the translation phase may segue into the review phase in a manner that is not immediately apparent to an invited translator connecting to the software 10 via an auxiliary terminal 18*a*-18*c*, or inputting a translation directly on the base terminal 12 through a GUI.

In another embodiment of the present invention, the order in which steps or phases are carried out could be modified, for example, source text analysis could be carried out before translation. In this event, translators may be able to view information, such as the context of the segment, before submitting a translation. An example of this embodiment is depicted in FIG. 5.

Returning to the embodiment of FIG. 4, interested parties who participate in the review of submitted translations, having been notified by the software 10, utilizing the software's text analysis interface 26, submit comments or other descriptive information, such as tags, etc., (and/or agree/disagree with comments, tags, etc. submitted by others), concerning the submitted translations for the source text. These participants may then participate in a group exercise of reviewing the translations that have been obtained for the various segments of the source. In this embodiment, interested parties will then use the translation review interface 30 to review, discuss and submit scores and/or ratings for the translations.

In embodiments of the present invention, the software 10 selects individuals and systems to review the translated segments that do not have fluency in the source language, but have fluency in the target language. For example, if the source text is in English and the target language for a translation is Hebrew, individuals who are fluent in Hebrew can be invited to evaluate the translated segments regardless of whether or not these individuals are fluent in English. Although these individuals cannot judge the accuracy of the translation, because these individuals are fluent in the target language and not the source language, these individuals can rate the translated segments based on accuracy, i.e., correct usage, grammar, phrasing, etc. in the translation. Although these individuals cannot provide scores, ratings, and/or feedback based on the correctness of the translation, the information provided regarding quality assists the software in determining which is the best translated segment for a given source segment and/or which is the best translation overall.

Like the threshold related to the number of translations and/or number of reviews of one or more segments of the source text, another optionally configurable parameter aids the software 10 in determining when enough feedback (e.g., scores) have been received for the software 10 to determine which of the submitted translations or translated segments are of a desired level of quality or are superior to other translations obtained. This threshold or parameter can be optionally set before the scoring. In one embodiment of the present invention, at least four votes are required per obtained segment translation in order to properly judge the quality of that segment.

In an embodiment of the present invention, once the software 10 obtains enough information regarding the quality of the segments, the software 10 can create a final translation, which can be a composite translation. A composite translation includes the "best" translation for each segment. The software can also create an overall best translation, i.e., a combination of all segments from a single translator based upon this translator's translated segments receiving an overall top score, regardless of whether the translator received the highest individual score and/or rating for each segment. Further embodiments of the present invention may create hybrids of the composite and a single translator result.

In an embodiment of the invention, rather than wait for the software 10 to determine that the threshold is met, an individual can utilize a GUI, such as one of the enumerated interfaces in FIG. 1, in order to review the submitted ratings and determine that the feedback is sufficient regarding the translations of translated segments to gerenate a single best translation and/or a composite translation, with an acceptable degree of confidence.

Referring to FIG. 4, the software 10 and/or an administrator determines that the reviews of the translations obtained are adequate (S470). Thus, in the embodiment of FIG. 4, after candidate translations have been scored to a degree judged to be adequate and/or sufficient (S470)), either by the software or by a human administrator, the translation compositing module 32 may be used to determine, based on the reviews and/or ratings and/or scoring that have been submitted by participants during the review phase, which of the candidate translations of each segment is to be regarded as "best."

As shown in FIG. 4, the software 10 builds the composite translation (S480). The software 10 assembles the "best" translation of each segment of text, taken together, to create at least one composite "best translation." As discussed earlier, further embodiments of the software can utilize the same rating and/or scoring data to generate a final translation that is the result of all the translations from a single translator, who may not have the highest rating for every segment, but has the overall highest rating/score for all segments overall.

Returning to FIG. 4, once this composite best translation has been created (or in further embodiments, an overall best translation), the software 10 sends an invitation through the invitation/access module 23 to suitable translators and/or other human participants, who will then have an opportunity to edit the composite translation, or the single overall translation identified, and to mark it as such in a way as to be considered final (S485).

As seen in FIG. 4, the software monitors editing and determines if the editing is complete (S490). When the editing is determined adequate, per FIG. 4, the software finalizes the translated text, i.e., the edited composite is considered final (S495).

In embodiments of the present invention that produce best translations from the translation of a single overall best translator (for the given source text), the software 10 may still invite a group to edit this translation. Although the text may flow better than a composite because it was created by one person, the benefits of editing by a group to further enhance the final product can still be realized.

In further embodiment of the present invention, whether the final text is a composite or from a single translator, the final editing and/or review stage may be skipped.

As seen in FIG. 4, embodiments of the system can gather intelligence based on the activities during a translation project. For example, translator performance data is stored (S496). This data can include, but is not limited to, whether the translator's segment was included in the composite, whether the overall best translation was created by the translator, the rankings assigned to this translator's efforts by participants in the review and the speed with which the translator translated the segment he or she translated. Thus, in embodiments of the present invention, the software 10 stores the ratings associated with the translators who translated the various, and the ratings associated with source text analyses, for possible use in prioritizing or weighting the translations, analyses or ratings provided by individuals in future projects (S496). In embodiments of the invention, the software 10 stores these cumulative ratings in the database 14.

In embodiments of the present invention, these cumulative ratings can be used by the software 10 to assign multipliers to various participants. The software 10 weighs the multipliers when evaluating the scoring and rating of translations, analyses and reviews. Thus, for example, when a score or rating comes from a translator whose work has been included in the past in a final product, by utilizing the multiplier, the software 10 will weigh the score and/or rating given by this participant more heavily than a rating from a participant without this record of past success.

Returning to FIG. 4, the software 10 may also publish the now final translation (S495), with accreditation, if appropriate (S497), where publishing includes, but is not limiting to, making public the final translation, returning the final translation to a client or client computer system, etc.

The groups of individuals and/or processes that participate in each phase of translation utilizing certain embodiments of the present invention, are not mutually exclusive.

Methods that embody aspects of the present invention can be understood as "phases." FIG. 5 is a workflow that depicts some of the phases that may be included in embodiments that practice the present technique 500 in an order of some embodiments of the present invention. Taken as a whole, the system of FIG. 5 can be viewed as one which accepts a source text to be translated as input, and returns as output one or more high-quality translations of the source text. In embodiments of the present invention, the high quality translation includes, but is not limited to, at least one composite translation, and/or at least one "best" translation from one or more translators.

The embodiment of FIG. 5 performs the following functionality: the software receives the text to be translated, segments the text, selects translators, makes the source text available for analysis, receives analysis from selected participants, makes the text segments and analyses available to the selected translators, receives translations for the segments, selects a group of reviewers to rate and/or review the quality and/or accuracy of the translated segments, solicits and receives reviews from the reviewers, and generates and/or identifies a high quality translation in part, based on the reviews.

In the embodiment of FIG. 5, once the software receives a text to be translated (i.e., the source text), the software 10 divides the text into a number of translatable segments and/or utilizes a standard industry program to divide the text into segments (S510). Segmenting the text allows the product to be of a desired quality at a granular level. Also, segmenting the text enables the participation of multiple individuals and/or automated processes without requiring the time commitment of translating and/or assisting in the verification, of an entire text. Additionally, segmenting the text allows the product to be of a desired quality at a granular level. Also, segmenting the text often enables increases in efficiency in the processes of analyzing source texts, submitting translations, submitting reviews and editing. As discussed earlier, the segmentation of the text may be actual and/or logical.

After the software 10 segments the text, the software selects and invites translators, human and/or automated, to participate in a translation phase as well as in other phases of the technique (S520). Those of skill in the art will recognize that inviting individuals and tapping processes to perform various tasks throughout the process can happen incrementally as well as concurrently in different embodiments of the present invention.

In this embodiment of the present invention, the source text is analyzed by participants, which can optionally include translators, before the translators translate the text. In other embodiments of the present invention, the translation of the source text occurs before the review of the source text. In the embodiment of FIG. 5, placing the review before the translation enables the translators to view the feedback regarding the source text from the reviewers, who can be native speakers of the source language, and can use this intelligence to inform their translations, producing translations of a higher quality.

In an embodiment of the present invention, when the selected translators participate in the translation process, and optionally other translators or human participate, these participants are given a means of collaboratively analyzing the source text, either overall or on a segment-by-segment basis. For example, the translators and/or other participants can be provided credentials to access a GUI and permissions to view different portions of the available text and submit analyses concerning the text. In this embodiment, the analyses performed by the participants is obtained by the technique (S530).

Figure 6A:
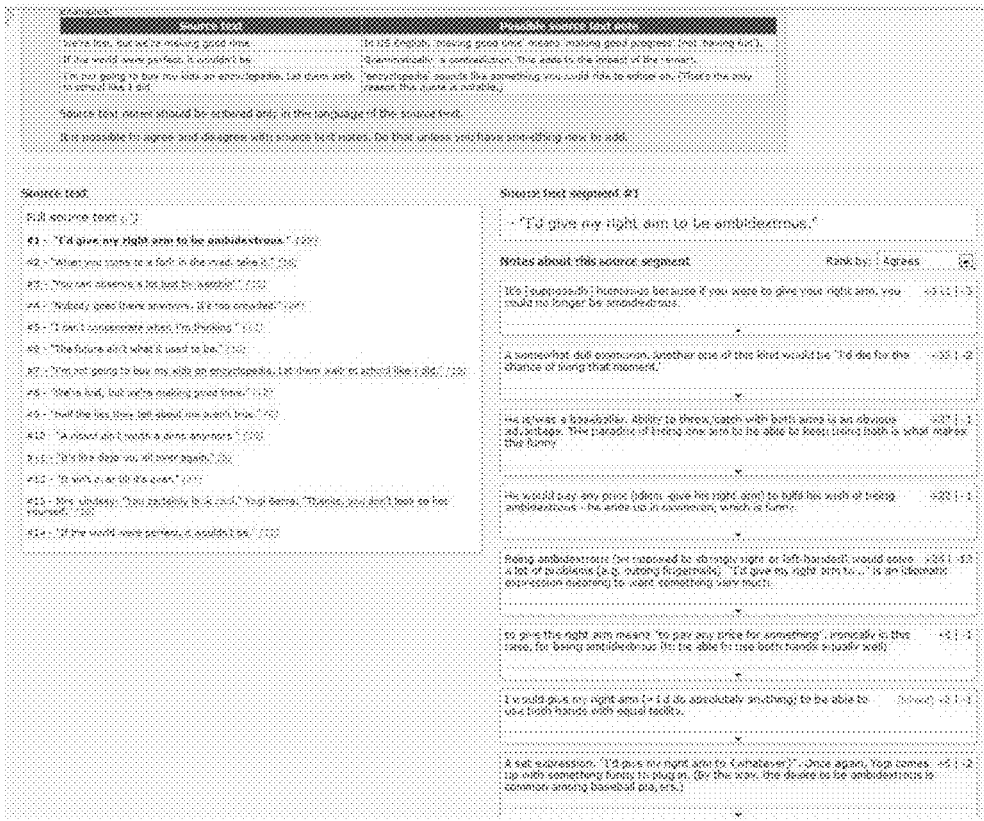

FIG. 6A is an example of a screenshot of a GUI in an embodiment of the present invention. In FIG. 6A, members of a group have accessed the source text and offered comments. Thus, FIG. 6A shows a GUI displaying the source text, with comments (and agrees/disagrees to those comments) concerning a selected segment. Note that the comments offered help explain the source text and therefore, guide the translation and the selection of a "best" translation. For example, in FIG. 6A, individuals reviewing the text have offered insight into what Yogi Berra meant when he stated, "I'd give my right arm to be ambidextrous." As seen in this figure, commenters attempted to explain the humor of the phrase and identify "I'd give my right hand," as an idiom. As discussed earlier, embodiments of the present invention introduce the participation of individuals and processes who cannot translate the segments into the desired language. These individuals can still add value by providing intelligence about the source text itself.

Figure 6B:
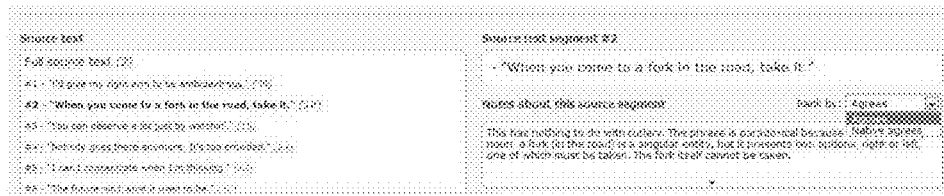

FIG. 6B is also an exemplary screenshot from the review phase and displays that the software 10 can optionally rank the comments received based on agrees and disagrees received specifically from native speakers of the language of the source (as opposed to ranking according to all agrees and disagrees). As discussed earlier, the native languages of the commenters can be tracked in a database.

In the translation phase, each segment is translated by at least one translator and the translations are obtained by the technique (S540). In an embodiment of the present invention, each segment is redundantly translated by multiple translators (S540).

In an embodiment of the present invention, this translation phase is accomplished in a competitive scenario in which each selected/invited translator, or optionally team of translators, working independently and without communicating with other translators, or teams of translators, involved in the process, seeks to produce the translation that will be judged best for that segment in a subsequent review.

In embodiment of the present invention, in addition to the natural motivation of a translators to translate well (or an understanding that automated translators that perform well will gain greater market share), additional incentives to produce translations that will be judged best may be added. In one embodiment, for example, the translation of the source text could be run in the form of a contest, with the translator whose set of candidate translations are rated and/or ranked and/or scored most highly being regarded as the "winner" of the contest. The fact that this translator has won a translation contest could be shown in a profile shown on the Internet as part of a network of translators, having won such a contest might also be one of the factors considered by an algorithm that determines the order in which translators are shown in a directory accessible to potential commercial clients. Utilization of the present technique in a contest setting is discussed in greater detail later in the specification.

When a threshold number of translations per segment and/or overall is obtained, and/or when a given amount of time has passed, the software 10 initiates a review phase, where a group of individuals and/or automated translators review the translations received for the segments. This group may include the translators who participated in the translation process and/or optionally other participants. In this phase, the pool of candidate translations produced in the translation phase is reviewed, and each is optionally scored or ranked. The technique obtains the reviews (S550).

In some embodiments of the present invention, commentary and information gathered during the "source text analysis" phase is made available for reference by the reviewers and/or translators. In various embodiments of the invention, feedback provided by participants during this phase can be both quantitative and qualitative. In one embodiment of the present invention, for each translated segmented, the software 10 obtains a value from a participating reviewer than not only represents a value representing the quality of the translation of a given segment, but also designates the quality of the translation in the context of other translations for the same segment. In a further embodiment of the present invention, the software can be configured to request ratings for a translated segment based on a number of pre-configured categories. The score for a given translated segment is then based on a weighted and/or raw compilation of these ratings.

Figure 6C:
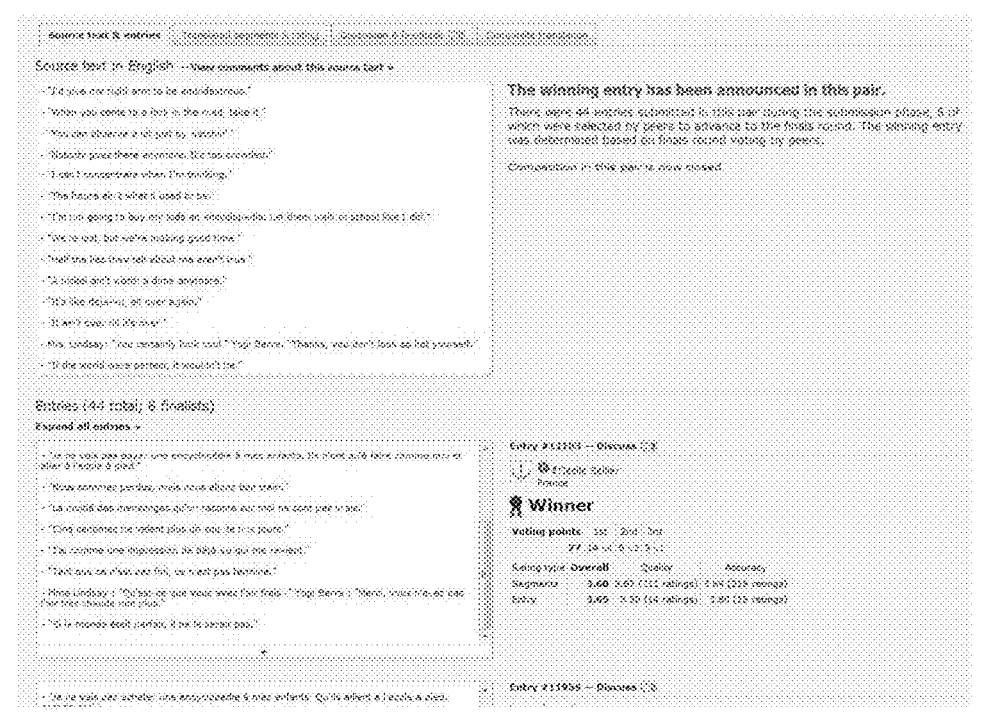
Figure 6D:
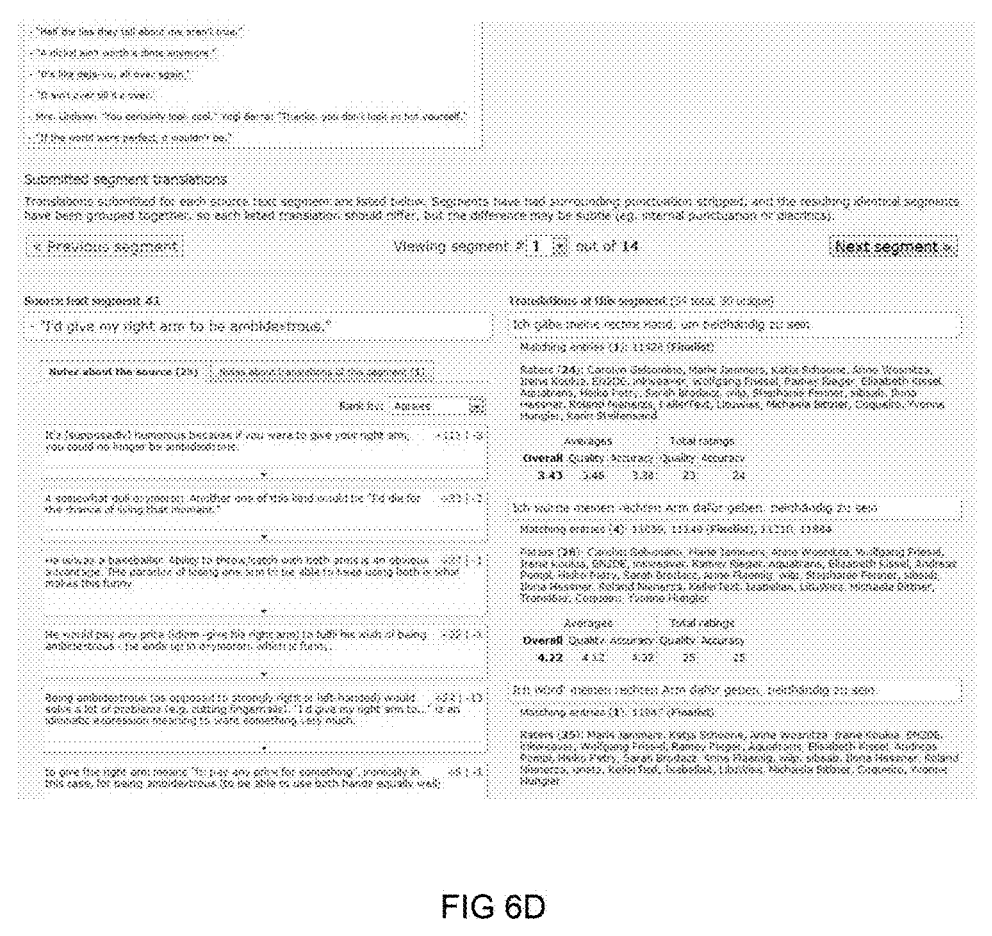

In one embodiment of the review phase, translations are ranked and/or scored. In one embodiment, a score is given for accuracy and for quality. Quality denotes the quality of the language (flow, grammar, etc.) and accuracy relates to how true the translation is to the original. Ranking enables a reviewer to order translations in terms of overall quality. When utilizing this scoring to select a "best" translation for each segment, the rankings can be weighted in accordance to who offered the ratings. For example, ratings offered by a translator whose work has received high scores on the past could be weighted higher than a new translator with less information stored in his or her profile and/or a translator whose work has not been included in past composite translations. FIG. 6C is an example of a page in a GUI in an embodiment of the present invention showing the entries in a given language pair, ranked according to "voting points" are used to knock out lower quality translations and "ratings" are scores for accuracy and quality. In the case where multiple translations are received for a given segment, participants in the review process may be given access to less than all the translations and the highest scored translations from each reviewer may be compared to select the best. FIG. 6D is an exemplary page in a GUI of an embodiment of the present invention showing a list of suggested translations of a given segment (with ratings).

Certain of the individuals and/or processes participating in the review of the translated segments may not be sufficiently fluent in the source language to provide feedback regarding the accuracy of the translation. In this case, these participants can provide feedback regarding the quality of the translation, meaning the correctness of the wording in the context of the language in which it was written. Some embodiments of the present invention enable participants to score and/or rate translation segments based on accuracy and/or quality without requiring values for both.

In some embodiments of the invention, the software 10 selects individuals who participated in the initial translation process to also review the submitted translations. To counteract the impulse of these translators to unfairly review their translations, in embodiments of the present invention, the software provides incentives for those participating in the review process to select the best translations for each segment, even if that means that the translations they select as best are not necessarily the ones that they themselves provided in the translation phase. For example, translators and/or other participants may be given a means of building their own personal composite best translations.

A personal composite best translation is a composite created by an individual utilizing the software 10. This individual can then share this personal composite with other participants, i.e., individuals accessing the software 10 can view these personalized composites. Users of the software 10 can select the composites created by other translators for use. Because the composites are attributed to the individuals who create them, the profile or reputation of the translator who created each personalized composite benefits from users selecting the personalized composite. The software 10 can track the use of personalized composites by users of the system and increment the ratings of the translators and save the ratings to reflect this approval.

In further embodiments of the present invention, the software 10 compares a personalized composite created by one translator with the resulting composite and/or best translation assembled by the software during the process. The software 10 generates and retains in memory a confidence rating for the translator who created the personalized composite based on the similarity between the personalized best translation and software's final translation. If the final product is a composite, for example, the software can rate the translator based on the percentage of segments selected by the translator that are the same as those selected by the software, for inclusion in the respective composites.

In another embodiment of the present invention, users of the system could provide ratings and/or review for the personalized composites, and these reviews could be reflected in a quality and/or confidence score assigned to the translator who created the personalized composite. This correspondence metric could be tracked for each participant and optionally made accessible to others. It could be used in controlling access to system features and particular forms of system participation and/or it could be incorporated into a ranking algorithm on a directory of translators provided to commercial clients, etc.

Returning to FIG. 5, once the software 10 determines a threshold level of reviews for the translations have been received, the software 10 creates a final translation (S560).

In certain embodiments of the present invention, the final translation is a composite translation. A composite translation is created from the candidate translations that are judged to be best for each segment. To determine which candidate translations are the best, the scores and/or rankings and/or ratings entered during the review process are used, either directly, or potentially on a weighted basis, taking into consideration information about the participating translators and reviewers, and potentially reviews of their previous translations, their previous review decisions, and other information.

In embodiments of the present invention, the software may take into account language variants and/or other factors when building such a composite best translations of the source text. In certain situations, the software may build more than one composite best translation and designate the best translations created for different uses. For example, when translating into certain languages, such as English, the geographic region where the composite translation will be used may be a factor in generating a best translation, i.e., British English and American English differ. Thus, a best translation for a United Kingdom audience may not be a best translation for an American audience. Hence, more than one composite best translation may be formed from a pool of candidate translations to reflect different regional preferences. A segment that is "best" for a UK translation may not be best for a US translation. Thus, in generating the composite translation, in embodiments of the present invention, the software can weigh factors such as dialect and native language variant of a translator when evaluating whether, despite a high rating, a given segment should be included in a translation for a given region. In some cases, the segment that is adjudged superior will not be included in a certain composite, but if the software creates more than one composite, taking into account the regional preferences, the segment will be included in one "best" composite but not in another.

Figure 6E:
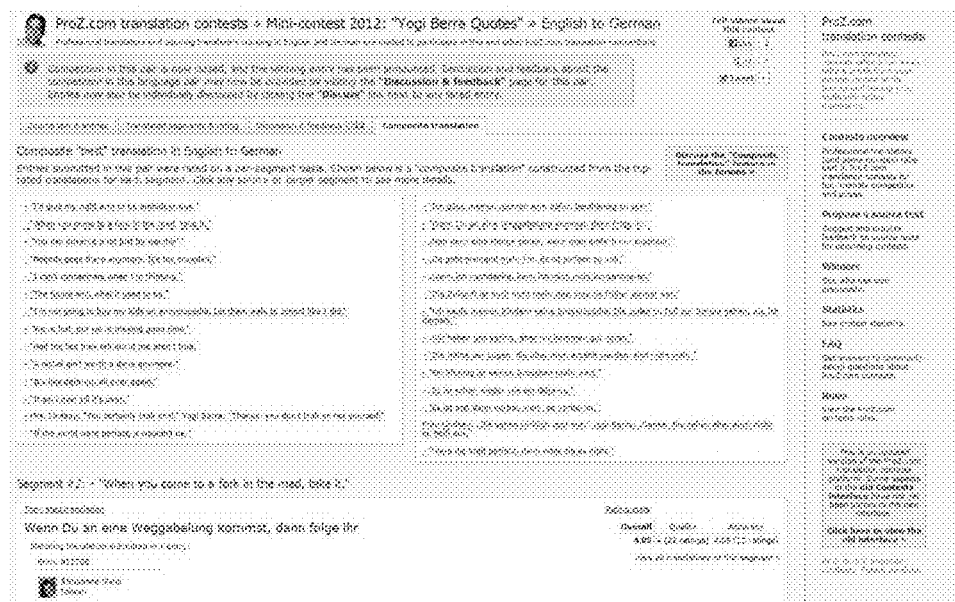

FIG. 6E is an example of a page in a GUI of an embodiment of the present invention showing a source text and a "composite" translation, side-by-side.

In embodiments of the present invention where the software produces a best translation from a single translator, the software utilizes the total scores of the source text translated by each translator on a segment-by-segment basis, and selects the best translation from an overall score, even if the translator did not achieve the highest score and/or rating on every individual segment. As discussed in reference to embodiments that produce composite translation, the software 10 can weigh certain ratings and scores higher than others based on external factors and database factors and can also select more than one "best" translation based on factors, including but not limited to, the audience.

In another embodiment of the present invention, the software may analyze the text before segmenting it in order to identify factors that could affect what will constitute the ultimate best translation. For example, the software may parse the source text to identify characteristics, such as sentence structure, rhyme, meter, and save these factors as desirable to preserve in the translation. When compiling the best translation, the software can weigh these factors in the ultimate creation of the composite(s).

In embodiments of the present invention, to potentially improve the quality and/or flow of the final composite best translation and/or of any final translation, the software may make the final translation available, for example, though a GUI, for final editing and obtain these edits (S570). The purpose of the final editing phase is to ensure consistency, quality, etc. of the result. In embodiments of the present invention, this phase can carried out either by individuals or collaboratively by a group. Once the editing phase, if entered into, is complete, the translation(s) is/are considered final.

In an embodiment of the present invention, information about each human participant's activities is saved on an ongoing basis. This information can be used to control invitation and/or access to the system or to activity facilitated during a certain phase of the process, during translation of the current source text or for translation of future source texts. This enhances the ability to control the caliber of participants in various phases of system operation, such as the translation phase, the source text editing phase, the review phase, the final (e.g., composite) editing phase, etc. This provides a basis for boosting the quality of participation, and therefore the quality of the translation output of the system, over the course of the translations being carried out.

Aspects of embodiments of the present invention can be utilized to create a contest for translators and aspiring translators. In this embodiment of the present invention, the software obtains and segments the text, but instead of, and/or in conjunction with, selecting participants, the software accepts request for participation and enables access to those participants. In a contest-related embodiment of the present invention, the software establishes profiles for the participants in order to retain information about each participant that can be used in later contests as discussed relative to other embodiments. In an embodiment of the present invention, the contest can include sub-contests where each sub-contest involves translating the source text segments into another language and/or into another dialect of a given language.

Participants access the source text segments and are given access to provide translation for segments. Participants are also able to provide information regarding the source text, as discussed earlier.

In at least one contest-related embodiment, after the expiration of a time period, the software disables entry of new translations and participants are invited to score the translations of others. In an embodiment of the present invention, participants may rank, score, comments, etc. on the translations offered by other participants. In an embodiment of the present invention, participants are asked to rank as well as score at least a group of the translations. In an embodiment of the present invention, scoring is based upon at least one of accuracy and/or quality.

Once the entries have been scored, the software determines which entry is the winning entry. In embodiments of the present invention, the software selects an overall winner based upon a cumulative score for all segments. In other embodiments, a winner is selected for each segment. Information regarding the contest results, such as the winners, is retained in the profiles of the participants. This information can be utilized later in the determinations of future winners. For example, the ratings and/or scores awarded to translators by a past winner may be weighted more heavily in the selection of a winner in a current contest.

In further embodiments of the present invention, participants in the review of the source text, the translation, and/or the review of the translations, are able to work collaboratively throughout the process. The software 10 has one or more interfaces that provide participants the opportunity to give unstructured comments about the text, translations, etc. By utilizing the communication interface, participants can excel at their roles more readily than if each worked alone.

Although the system has been described in specific detail with reference to the disclosed embodiments, it will be understood by those of skill in the art that many variations and modifications may be effected within the spirit and scope of the invention.

Many alternative uses of the system can be understood by those active in the field or related fields. Instead of applying the system in translation, with source texts as input and translators and other humans as participants, for example, the system could be used in the following and other ways: in place of a source text, a set of points to communicate could be loaded into the system, and instead of translators and optionally other human participants, a group of writers and optionally other human participants, for example experts in a given field, could be invited to take part in the generation of candidate sentences, which could then be composed into one composite "best text", "best pitch", "best argument", "best script", "best report", or similar; given a source text, the efforts of a number of human participants could be directed at paraphrasing or explaining the text, through a process of explaining or paraphrasing each segment in the text and then reviewing and scoring them, composing a "composite best" paraphrased text, set of explanatory notes, etc.; given a group of images, the efforts of a number of human participants could be directed at creating captions, tagging the images, and so on, with the competitive and collaborative mechanisms of the system being applied so that a composite set of "best captions", "best tags" or similar could be generated; given a list of questions, the efforts of a number of human experts in a given field could be directed at creating answers, with the competitive and collaborative mechanisms of the system being applied so that a composite set of "best answers" (for use in customer support, web-based FAQ systems, etc.), or similar could be generated; given a group of words, the efforts of a number of human experts in a given field could be directed at creating definitions, with the competitive and collaborative mechanisms of the system being applied so that a composite glossary, dictionary, or similar, could be generated; given a list of topic area, a set of "best links" could be created. Many other such applications can be imagined in various fields.

Alternative uses are possible also for parts of the system applied separately. For example, the segmenting system and source text analysis features could be used to collect reactions from a group of people to specific parts of a given text, applicable to texts such as reviews, comments on, etc., or scoring of, texts, translations, etc., for purposes of quality review, market research, etc. Embodiments of the system can also be used as the basis for testing the proficiency of a translator, writer, editor, etc. The system can also be used as a platform for facilitating competitions among translators, writers, editors, etc.

Other alternative uses of the system can be envisioned even in the embodiments and process described, if the focus is applied on inputs other than the source text and outputs other than the translated text. For example, one possible application of the system is in the vetting of translators. As a means of qualifying translators for participation in a translation project, for example, a project manager might invite the translator to participate in a group translation via the system, and then make the decision on whether or not to hire the translator on the basis of the activity that s/he exhibits, and the reviews, and the reviews, ratings, etc., that his/her translations earn, in the course of working through the system in the disclosed embodiments.

In further embodiments of the present invention, certain phases of the process, for example segmentation of the source text, analysis of the source text, and others, could optionally be left out. In some embodiments of the present invention, additional processes or steps or phases (for example, machine translation, automated quality checks or other procedures could be introduced).

Below, Example 1 is a recitation of an embodiment of at least one aspect of the present invention.

Example 1

FIG. 1 shows a schematic view of the present system utilized in this example. The software 10 is installed on a "base" computer 12, for example a web server, which may be capable of running the software and hosting and/or interacting with the database 14. Included in the software may be, among others, an invitation/access module 23, a segmenting module 24, source text analysis interface 26, translating interface 28, translation review interface 30, translation compositing module 32, composite translation editing interface 34 and a software administrative interface 36.

The base computer may be connected to a computer network 16, such as the Internet. One or more "auxiliary" computers 18, suitable for a human translator to use in viewing source texts and submitting translations, may also be connected to the computer network 16.

The text to be translated 20, optionally with associated information such as the language of the text, is stored in the database 14. Also stored in the database 14 may be the data on translators and other human participants 22 (which might include contact information for translators and others, the languages they work in and other such information, and for contact and other information for people capable of analyzing written texts).

In operation, in Example 1, the software 10 is installed on the base computer. The translator data 22 may be loaded into the database. The text to be translated 20 is loaded into the database 14. The text 20 may be divided into translatable segments by a "segmenting module" 24 included in the software.

Referencing the translator data 22, the invitation/access module 23 may determine which translators should be notified, and may notify them, for example by email or other form of notification that can be sent over a network, of the fact that the text 20 is available for translation. Translators may then submit translations, via the translating interface 28, on a segment by-segment basis, of the text 20. These translations are stored in the database, optionally together with information about the translators who have submitted them.

At some point after translations have been obtained from multiple translators, notification may be sent, either automatically or at the request of an operator using the software's administrative interface 36, to suitable translators and/or text analyzers to invite them to participate in a group exercise of analyzing the source text. Interested parties may then, using the source text analysis interface 26, submit comments or other descriptive information, such as tags, etc., (and/or agree/disagree with comments, tags, etc. submitted by others), concerning the source text.

At some point after translations have been obtained from multiple translators, notification may be sent, either automatically or at the request of an operator using the software's administrative interface 36, to suitable translators to invite them to participate in a group exercise of reviewing the translations that have been obtained for the various segments of the source text 20. Interested parties will then use the translation review interface 30 to review, discuss and score translations.

After candidate translations have been scored to a degree judged to be sufficient, either by the software or by a human administrator, the translation compositing module 32 may be used to determine, based on the reviews and/or ratings and/or scoring that have been submitted by participants during the review phase, which of the candidate translations of each segment is to be regarded as "best."

The "best" translation of each segment of text, taken together, are considered the "composite 'best translation.'" Once this "composite 'best translation'" has been created, an invitation may be sent by the invitation/access module 23 to suitable translators and/or other human participants, who will then have an opportunity to edit the composite translation, and mark it is such a way as to be considered final.

The system described herein addresses the problem of the difficulty of translating challenging texts, by bringing to bear the collective creativity, intelligence and judgment of a large group of human translators and other human participants to produce high-quality translations of such texts.

A specific embodiment of a system of Example 1 includes some of the following features:

Once a text to be translated is received (the "source text"), it is divided up into a number of translatable "segments."

In a "translation phase", each segment is redundantly translated by multiple translators, in a competitive scenario in which each translator, or optionally team of translators, working independently and without communicating with other translators, or teams of translators, involved in the process, seeks to produce the translation that will be judged best for that segment in a subsequent review. Apart from the natural motivation of a translator to translate well, additional incentives to produce translations that will be judged best may be added in various ways. For example, the translation of the source text could be run in the form of a contest, with the translator whose set of candidate translations are rated and/or ranked and/or scored most highly being regarded as the "winner" of the contest. The fact that this translator has won a translation contest could be shown in a profile shown on the Internet as part of a network of translators, having won such a contest might also be one of the factors considered by an algorithm that determines the order in which translators are shown in a directory accessible to potential commercial clients.

In a "source text analysis" phase, those who participated in the translation process, optionally, and optionally other translators or human participants, are given a means of collaboratively analyzing the source text, either overall or on a segment-by-segment basis.

In a "review phase", carried out optionally by the translators who participated in the translation process and/or optionally by other human participants, the pool of candidate translations produced in the translation phase is reviewed, and each is optionally scored or ranked. Commentary and information gathered during the "source text analysis" phase is made available for reference by the reviewers.

Incentives may be provided for those participating in the review process to select the best translations for each segment, even if that means that the translations they select as best are not necessarily the ones that they themselves provided in the translation phase. For example, translators may be given a means of building their own personal "composite 'best translation'." In addition to the motivation provided by a desire to build a true "best translation," composites created by individual participants might be made accessible to other system participants in connection with that participant, thereby representing a reflection on his/her judgment. Or, a method could be used to determine the degree to which each individual's own "composite 'best translation'" corresponds with the "composite 'best translation'" ultimately decided upon using the ratings and/or reviews and/or scoring provided by the entire group. This correspondence metric could be tracked for each participant and optionally made accessible to others, it could be used in controlling access to system features and particular forms of system participation, it could be incorporated into a ranking algorithm on a directory of translators provided to commercial clients, etc.

A composite translation (the "composite 'best translation'") is created from the candidate translations that are judged to be best for each segment. To determine which candidate translations were judged to be best, the scores and/or rankings and/or ratings entered during the review process are used, either directly or potentially on a weighted basis, taking into consideration information about the participating translators and reviewers, and potentially reviews of their previous translations, their previous review decisions, and other information.

Language variants and other factors may be taken into consideration when building such composite "best translations" of the source text. Hence, more than one composite "best translation" may be formed from a pool of candidate translations. (For example, there might be a "best translation" into British English, one into US English, etc.)

The composite "best translation(s)" are optionally subjected to final editing, in a final "composite editing phase," the purpose of which is to ensure consistency, quality, etc. This phase is carried out either by individuals or collaboratively by a group.

Once the "composite editing phase", if entered into, is complete, the "composite 'best translation(s)'" is/are considered final. This/these are the output of the translation process.

Taken as a whole, the system can be viewed as one which accepts a text to be translated (the "source text") as input, and returns as output one or more high-quality translations of the source text.

Information about each human participant's activities is saved on an ongoing basis. This information can be used to control invitation and/or access to the system or to activity facilitated during a certain phase of the process, during translation of the current source text or for translation of future source texts. This enhances the ability to control the caliber of participants in various phases of system operation, such as the translation phase, the source text editing phase, the review phase, the composite editing phase, etc. This provides a basis for boosting the quality of participation, and therefore the quality of the translation output of the system, over the course of multiple translations being carried out.

Accordingly a small sample of combinations set forth in Example 1 are in the following sections, designated A1 to B4:

A1. A method for facilitating the high quality translation of matter by multiple translators, the method comprising: obtaining, by a processor, translated segments from a first group, wherein each translated segment is a translation of a source text segment, wherein each source text segment is a portion of a source text, and wherein for each of the source text segments, at least one translated segment is obtained; selecting a second group and notifying the second group of an opportunity, wherein the opportunity comprises the second group accessing the translated segments obtained from the first group and the second group providing data regarding the quality of the translated segments; obtaining, by the processor, the data regarding the quality of the segments from the second group and determining a designated translated segment for each source text segment; and generating, by the processor, a final translation wherein the final translation comprises the designated segment for each source text segment and wherein the final translation comprises a translation of the source text.

A2. The method of A1 wherein the second group includes the first group.

A3. The method according to A1, wherein the first group and the second group are selected from a database.

A4. The method of A1, further comprising: selecting a third group and notifying the third group of a text analysis opportunity, wherein the text analysis opportunity comprises the third group accessing the source text and providing data regarding the source text, and wherein the determining comprises evaluating the data regarding the source text and applying it to determining at least one designated translated segment.

A5. The method of A4, wherein the designating comprises for each source text segment, selecting a translated segment with the highest quality and wherein at least a portion of this selection is based on the data obtained from the second group.

A6. The method of A5, wherein at least a portion of this selection is based on the data obtained from the third group.

A7. The method of A1, further comprising: obtaining, by the processor, the source text, and segmenting the source text into the source text segments.

A8. The method of A3, wherein the second group is selected from a group of potential group members and wherein profile data relating to each member of the group of potential group members is stored in the database, the selecting further comprising: comparing elements related to the source text with profile data for each potential group member.

B1. A computer system for facilitating the high quality translation of matter by multiple translators, the computer system comprising: a memory; and a processor in communications with the memory, wherein the computer system is configured to perform a method, said method comprising: obtaining, by a processor, translated segments from a first group, wherein each translated segment is a translation of a source text segment, wherein each source text segment is a portion of a source text, and wherein for each of the source text segments, at least one translated segment is obtained; selecting a second group and notifying the second group of an opportunity, wherein the opportunity comprises the second group accessing the translated segments obtained from the first group and the second group providing data regarding the quality of the translated segments; obtaining, by the processor, the data regarding the quality of the segments from the second group and determining a designated translated segment for each source text segment; and generating, by the processor, a final translation wherein the final translation comprises the designated segment for each source text segment and wherein the final translation comprises a translation of the source text.

B2. The computer system of B1, the method further comprising: selecting a third group and notifying the third group of a text analysis opportunity, wherein the text analysis opportunity comprises the third group accessing the source text and providing data regarding the source text, and wherein the determining comprises evaluating the data regarding the source text and applying it to determining at least one designated translated segment.

B3. The computer system of B2, wherein the designating comprises for each source text segment, selecting a translated segment with the highest quality and wherein at least a portion of this selection is based on the data obtained from the second group.

B4. The computer system of B2, wherein the second group is selected from a group of potential group members and wherein profile data relating to each member of the group of potential group members is stored in a database, the selecting further comprising: comparing elements related to the source text with profile data for each potential group member.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The invention claimed is:

1. A method for facilitating the high quality translation of matter by multiple translators, the method comprising:
   generating, by a processor, a customized graphical user interface accessible from a computing resource over an Internet connection;
   displaying, by the processor, via the customized graphical user interface, to a first group, source text for translation from a first language to a second language;
   obtaining, by the processor, via the customized graphical user interface, translated segments from each member of the first group, wherein each translated segment is a translation of a source text segment from the first language to the second language, wherein each source text segment is a portion of the source text, and wherein for each of the source text segments, at least one translated segment is obtained from each member of the first group, wherein the customized user interface displays to each member only the at least one translated segment obtained from that member;
   selecting a second group and notifying the second group of an opportunity, wherein the opportunity comprises the second group accessing the translated segments obtained from the first group via the customized graphical user interface, and the second group providing data regarding the quality of the translated segments;
   selecting a third group and notifying the third group of a text analysis opportunity, wherein the third group of people comprises native speakers of the first language, wherein the text analysis opportunity comprises the third group accessing the source text via the customized graphical user interface, and providing data regarding the source text, wherein the data includes contextualization of the source text;
   granting the first group access to the data regarding the source text from the third group, via the customized graphical user interface, before obtaining the translated segments from the first group, wherein for each source text segment of the source text, the customized graphical user interface displays a given source text segment together with data related to the given source text segment to each member of the first group in advance to obtaining the translated segments;
   obtaining, by the processor, the data regarding the quality of the segments from the second group and determining, based in the data, a designated translated segment for each source text segment, wherein the determining further comprises, for each source text segment, selecting the respective translated segment with the highest numerical value representing at least one of quality and accuracy, wherein the obtaining is via the customized user interface is based on displaying, by the processor, in the customized user interface the segments from the second group, the displaying comprising:
  stripping, by the processor, punctuation from each of the segments;
  determining, by the processor, similarities between the segments without the punctuation; and
  based on the determining grouping, by the processor, in the customized user interface, segments with similarities from the segments, together;
generating, by the processor, a final translation wherein the final translation comprises the designated segment for each source text segment and wherein the final translation comprises a translation of the source text;
determining, by the processor, an originator from the first group for each designated segment;
notifying, by the processor over the Internet connection, the originator of each designated segment of the determination; and
displaying, by the processor, an identifier of the originator of each designated segment, in an area of the customized graphical user interface publicly accessible over the Internet connection, wherein the customized graphical interface displays the source text and the final translation side-by-side.

2. The method of claim 1 wherein the second group includes the first group.

3. The method according to claim 1, wherein the first group and the second group are selected from a database.

4. The method of claim 1, wherein the determining comprises evaluating the data regarding the source text and applying it to determining at least one designated translated segment.

5. The method of claim 1, wherein the designating comprises for each source text segment, selecting a translated segment with the highest quality and wherein at least a portion of this selection is based on the data obtained from the second group.

6. The method of claim 1, further comprising:
  obtaining, by the processor, the source text, and segmenting the source text into the source text segments; and
  selecting the first group and enabling the first group to access the source text segments.

7. The method of claim 3, wherein the second group is selected from a group of potential group members and wherein profile data relating to each member of the group of potential group members is stored in the database, the selecting further comprising:
  comparing elements related to the source text with profile data for each potential group member.

8. The method of claim 1, wherein the data regarding the quality of the translated segments comprises numerical values representing quality and accuracy.

9. The method of claim 8, wherein the data regarding the quality of the translated segments comprises a multiplier representing the quality of the group member who scored the translated segments.

10. A computer program product for facilitating the high quality translation of matter by multiple translators, the computer program product comprising:
  a non-transitory computer readable storage medium readable by a processing circuit and storing instructions for execution by the processing circuit for performing a method comprising:
    generating, by a processor, a customized graphical user interface accessible from a computing resource over an Internet connection;
    displaying, by the processor, via the customized graphical user interface, to a first group, source text for translation from a first language to a second language;
    obtaining, by the processor, via the customized graphical user interface, translated segments from each member of the first group, wherein each translated segment is a translation of a source text segment from the first language to the second language, wherein each source text segment is a portion of the source text, and wherein for each of the source text segments, at least one translated segment is obtained from each member of the first group, wherein the customized user interface displays to each member only the at least one translated segment obtained from that member;
    selecting a second group and notifying the second group of an opportunity, wherein the opportunity comprises the second group accessing the translated segments obtained from the first group via the customized graphical user interface, and the second group providing data regarding the quality of the translated segments;
    selecting a third group and notifying the third group of a text analysis opportunity, wherein the third group of people comprises native speakers of the first language, wherein the text analysis opportunity comprises the third group accessing the source text via the customized graphical user interface, and providing data regarding the source text, wherein the data includes contextualization of the source text;
    granting the first group access to the data regarding the source text from the third group, via the customized graphical user interface, before obtaining the translated segments from the first group, wherein for each source text segment of the source text, the customized graphical user interface displays a given source text segment together with data related to the given source text segment to each member of the first group in advance to obtaining the translated segments;
    obtaining, by the processor, the data regarding the quality of the segments from the second group and determining, based in the data, a designated translated segment for each source text segment, wherein the determining further comprises, for each source text segment, selecting the respective translated segment with the highest numerical value representing at least one of quality and accuracy, wherein the obtaining is via the customized user interface is based on displaying, by the processor, in the customized user interface the segments from the second group, the displaying comprising:
      stripping, by the processor, punctuation from each of the segments;
      determining, by the processor, similarities between the segments without the punctuation; and
      based on the determining grouping, by the processor, in the customized user interface, segments with similarities from the segments, together;
    generating, by the processor, a final translation wherein the final translation comprises the designated segment for each source text segment and wherein the final translation comprises a translation of the source text;

determining, by the processor, an originator from the first group for each designated segment;

notifying, by the processor over the Internet connection, the originator of each designated segment of the determination; and displaying, by the processor, an identifier of the originator of each designated segment, in the an area of the customized graphical user interface publicly accessible over the Internet connection.

11. The computer program product of claim 10, wherein the second group includes the first group.

12. The computer program product of claim 10, wherein the first group and the second group are selected from a database.

13. The computer program product of claim 10, wherein the determining comprises evaluating the data regarding the source text and applying it to determining at least one designated translated segment.

14. The computer program product of claim 12, wherein the designating comprises for each source text segment, selecting a translated segment with the highest quality and wherein at least a portion of this selection is based on the data obtained from the second group.

15. A computer system for facilitating the high quality translation of matter by multiple translators, the computer system comprising:

a memory; and a processor in communications with the memory, wherein the computer system is configured to perform a method, said method comprising:

generating, by a processor, a customized graphical user interface accessible from a computing resource over an Internet connection;

displaying, by the processor, via the customized graphical user interface, to a first group, source text for translation from a first language to a second language;

obtaining, by the processor, via the customized graphical user interface, translated segments from each member of the first group, wherein each translated segment is a translation of a source text segment from the first language to the second language, wherein each source text segment is a portion of the source text, and wherein for each of the source text segments, at least one translated segment is obtained from each member of the first group, wherein the customized user interface displays to each member only the at least one translated segment obtained from that member;

selecting a second group and notifying the second group of an opportunity, wherein the opportunity comprises the second group accessing the translated segments obtained from the first group via the customized graphical user interface, and the second group providing data regarding the quality of the translated segments;

selecting a third group and notifying the third group of a text analysis opportunity, wherein the third group of people comprises native speakers of the first language, wherein the text analysis opportunity comprises the third group accessing the source text via the customized graphical user interface, and providing data regarding the source text, wherein the data includes contextualization of the source text;

granting the first group access to the data regarding the source text from the third group, via the customized graphical user interface, before obtaining the translated segments from the first group, wherein for each source text segment of the source text, the customized graphical user interface displays a given source text segment together with data related to the given source text segment to each member of the first group in advance to obtaining the translated segments;

obtaining, by the processor, the data regarding the quality of the segments from the second group and determining, based in the data, a designated translated segment for each source text segment, wherein the determining further comprises, for each source text segment, selecting the respective translated segment with the highest numerical value representing at least one of quality and accuracy, wherein the obtaining is via the customized user interface is based on displaying, by the processor, in the customized user interface the segments from the second group, the displaying comprising:

stripping, by the processor, punctuation from each of the segments;

determining, by the processor, similarities between the segments without the punctuation; and based on the determining grouping, by the processor, in the customized user interface, segments with similarities from the segments, together;

generating, by the processor, a final translation wherein the final translation comprises the designated segment for each source text segment and wherein the final translation comprises a translation of the source text;

determining, by the processor, an originator from the first group for each designated segment;

notifying, by the processor over the Internet connection, the originator of each designated segment of the determination; and displaying, by the processor, an identifier of the originator of each designated segment, in the an area of the customized graphical user interface publicly accessible over the Internet connection.

16. The computer system of claim 15, wherein the determining comprises evaluating the data regarding the source text and applying it to determining at least one designated translated segment.

* * * * *